United States Patent [19]

Slusser

[11] 4,109,721
[45] Aug. 29, 1978

[54] METHOD OF PROPPANT PLACEMENT IN HYDRAULIC FRACTURING TREATMENT

[75] Inventor: Marion L. Slusser, Arlington, Tex.

[73] Assignee: Mobil Oil Corporation, New York, N.Y.

[21] Appl. No.: 832,699

[22] Filed: Sep. 12, 1977

[51] Int. Cl.$^2$ .............................................. E21B 43/26
[52] U.S. Cl. ................... 166/280; 166/281; 166/308
[58] Field of Search ............. 166/280, 308, 281, 283, 166/259, 271

[56] References Cited

U.S. PATENT DOCUMENTS

| | | | |
|---|---|---|---|
| 3,127,937 | 4/1964 | McGuire, Jr. et al. | 166/280 |
| 3,155,159 | 11/1964 | McGuire, Jr. et al. | 166/280 |
| 3,235,007 | 2/1966 | Kern et al. | 166/280 |
| 3,709,300 | 1/1973 | Pye | 166/280 |
| 3,710,865 | 1/1973 | Kiel | 166/308 |
| 3,818,990 | 6/1974 | Coulter | 166/280 |
| 3,858,658 | 1/1975 | Strubhar et al. | 166/280 X |
| 3,896,877 | 7/1975 | Vogt, Jr. et al. | 166/280 X |
| 3,987,850 | 10/1976 | Fitch | 166/280 X |
| 3,998,271 | 12/1976 | Cooke, Jr. et al. | 166/280 |

OTHER PUBLICATIONS

Buchley et al., "What to Learn about Hydraulic Fracturing Fluids", The Oil & Gas Journal, Sep. 17, 1973, pp. 84–88.

Cooke, Jr., "Effect of Fracturing Fluids on Fracture Conductivity", Journal of Petroleum Technology, Oct. 1975, pp. 1273–1282.

*Primary Examiner*—Stephen J. Novosad
*Attorney, Agent, or Firm*—C. A. Huggett; Henry L. Ehrlich

[57] ABSTRACT

This specification discloses a hydraulic fracturing process for forming and propping a vertical fracture in a subterranean formation. This method is particularly applicable for large fracture treatments where fracturing fluids with little or no fluid loss additives are employed to extend long vertical fractures into the formation. It is also particularly applicable for refracturing a formation that has previously been fractured and propped with a proppant pack along the lower portion of the fracture. After a first proppant pack is deposited in the lower portion of the fracture, a slug of fracturing fluid liquid containing fluid loss additives is injected into the formation to deposit the fluid loss additives along the upper surface or leading edge of the proppant pack and thereby provide a seal along this upper edge of the proppant pack. Thereafter a high filter loss fracturing fluid with little or no fluid loss additives but containing proppantsl is injected via the well into the formation at a pressure and in an amount sufficient to extend the fracture further into the subterranean formation and prop the extended portion of the fracture.

8 Claims, No Drawings

METHOD OF PROPPANT PLACEMENT IN HYDRAULIC FRACTURING TREATMENT

BACKGROUND OF THE INVENTION

This invention is directed to a method of hydraulically fracturing a subterranean earth formation from a well penetrating the formation and more particularly to sealing the upper edge of a proppant pack or bed formed in the lower portion of a vertical fracture to better extend the vertical fracture further into the formation and prop the extended portion thereof.

Hydraulic fracturing techniques are commonly employed in completing a well to increase the recovery of hydrocarbons from subterranean formations. Generally, these techniques involve injecting a fracturing fluid down a well and into the formation under sufficiently high pressure to initiate and propagate a fracture into the formation. Proppant materials are generally entrained in the fracturing fluid and are deposited in the fracture to maintain the fracture open. It is generally considered that at depths greater than about 3,000 feet, vertical or vertically inclined fractures rather than horizontal fractures are usually formed when carrying out hydraulic fracturing techniques. This is because at any substantial depths most formations have a preferred vertical fracture orientation because of naturally occurring planes of weakness in the formation and the fractures are formed and propagated along these planes of weakness.

Many different types of fracturing fluids have been employed. In an article entitled "What to Learn About Hydraulic Fracturing Fluids", T. C. Buchley and D. L. Lord, OIL AND GAS JOURNAL, Sept. 17, 1973, pp. 84–88, it is said that present day fracturing fluids are classed as Newtonian polymer solutions, cross-linked polymer solutions, emulsions, micellar solutions, and gel-organic liquids in solution with a liquefied gas. A fracturing fluid also normally contains propping material and fluid loss additives. A common propping material is sand of 20–40 mesh size. Other types of propping material sometimes used include glass beads and nut shells. The term "sand" is often used generically to include any propping material usable for propping or maintaining open fractures formed in subterranean formations by hydraulic fracturing techniques.

In the above-cited article to Buchley et al., it is taught that created fracture volumes are greatly diminished if a large portion of the injected fluid is lost to porous fracture faces. Thus, if a fluid does not inherently have satisfactory fluid loss control, it is generally necessary to add particulate and/or gelatinous material which forms a filter cake on fracture faces to control loss to the porous rock matrix. In U.S. Pat. No. 3,710,865 to Othar M. Kiel, it is pointed out that it has long been known that the fluid efficiency of a fracturing fluid must be high if fractures of reasonable length and widths are to be obtained. Fluid efficiency as used in fracturing operations is defined as the per cent of injected fluid which remains within the fracture and is a measure of the fluid loss characteristics of the fluid. Many fluids tend to leak off rapidly into the formation matrix and therefore provide low fluid efficiencies. The fluid efficiency can be improved by the addition of fluid loss control additives.

Fracturing fluids are sometimes designed, however, to be free of fluid loss additives and to have high leak-off properties. In U.S. Pat. No. 3,858,658 to Malcolm K. Strubhar et al., such fracturing fluids are found to be desirable. The invention described by Strubhar et al. is concerned with a hydraulic fracturing method for forming long, narrow, vertical fractures in a thick low permeability formation. The formation is treated by injecting thereinto in a single stage and at a relatively low injection rate a very large volume of relatively low viscosity fracturing fluid.

In carrying out hydraulic fracturing techniques, a formation is fractured or parted by application of hydraulic pressure. After release of the hydraulic pressure, the formation tends to close together again and thus heal the fracture. Propping material and generally sand have long been included in hydraulic fracturing fluids such that the propping material is deposited in the formed fracture to maintain the fracture open after the hydraulic pressure is released. Many efforts have been made to arrive at optimum techniques for placing proppants in fractures to obtain efficient flow channels. In U.S. Pat. No. 3,896,877 to Thomas C. Vogt, Jr. et al., there is described a hydraulic fracturing process of forming and propping a vertical fracture in a subterranean formation. Propping material is scheduled into the fracturing fluid in amounts sufficient to fill the fracture to a predetermined height concomitantly with the forming of the fracture. The schedule provides for a high concentration of propping material in the fracturing fluid early in the fracturing treatment and decreasing concentration as the fracture is extended into the formation. In U.S. Pat. No. 3,709,300 to David S. Pye, there is described a process for hydraulically fracturing a permeable subterranean formation traversed by a well in which the deposition of propping agent in the fracture adjacent to the well is assured. The fracture is formed and extended and an initial deposit of propping agent placed in the fracture using a low fluid loss fracturing fluid so that the permeability of exposed faces of the fracture is reduced. The permeability of the formation is then restored and additional propping agent is again deposited in the fracture using a fluid having a high fluid loss characteristic. A large proportion of the propping agent injected into the fracture in this stage of the treatment is deposited in the fracture adjacent to the well thereby assuring fracture permeability in the critical area adjacent to the well.

The use of fluid loss additives in fracturing fluids, though offering certain benefits, is also known to cause problems. For example, the fluid loss additives are deposited on the fracture faces, thus reducing the permeability of the subterranean formation adjacent the fracture. Subsequent treatments are called for to remove the fluid loss additives from the fracture faces. Fluid loss additives are also deposited in the proppant pack itself, thereby reducing the permeability of the proppant pack and thus reducing the flow capacity of the fracture.

Other problems have occurred when using fracturing fluids having little or no fluid loss additives in that a large amount of the fracturing fluid leaks off into the formation and thus limits the length of a fracture which may be formed in a formation. At times it is considered that the loss of fluid is so severe that a "sand out" occurs, that is, that the sand or proppant carried in the fracturing fluid builds up in the fracture to such an extent that it blocks flow of the fracturing fluid into the fracture. Such problems have occurred particularly when attempting to carry out a very large fracturing treatment using fracturing fluids having no fluid loss additives therein, and when refracturing wells in which a fracture has previously been formed and a proppant

SUMMARY OF THE INVENTION

This invention is directed to a hydraulic fracturing technique for generating and propping a vertical fracture into a subterranean formation penetrated by a well. There is injected via the well into the formation a high fluid loss fracturing fluid containing proppants that will settle therefrom to form in the fracture a first proppant pack extending outwardly from the well and upwardly from the lower portion of the fracture. A low fluid loss fluid containing a sealant is thereafter injected into the fracture to deposit the sealant along the upper surface of the proppant pack and reduce the permeability thereof. Thereafter, the injection of a high fluid loss fracturing fluid containing proppants that will settle therefrom is continued to form a second proppant pack in the fracture overlying the first proppant pack and extending outwardly from the well to a distance beyond the first proppant pack.

DESCRIPTION OF THE PREFERRED EMBODIMENTS

This invention is directed to a method of hydraulically fracturing a subterranean earth formation and more particularly to fracturing a formation using a high fluid loss fracturing fluid.

In the carrying out of a fracturing technique wherein there is injected via a well into a subterranean formation a high fluid loss fracturing fluid containing proppants that will settle therefrom to form and propagate a vertical fracture in the formation and form a proppant pack therein, a point in time may be reached wherein there is lost to the formation a sufficient amount of the liquid portion of the fracturing fluid that the rate of propagation of the fracture into the formation greatly decreases and the propagation of the fracture into the formation may effectively cease. Under these conditions proppant material is continually deposited in the formed fracture and the liquid portion of the fracturing fluid is lost to the formation which results in a build-up of a proppant material in the fracture, thereby blocking the entrance of fracturing fluid thereinto and resulting in a sand out. A large amount of the liquid portion of the fracturing fluid which is lost to the formation flows through the proppant pack and flows therefrom into the formation itself. A similar situation may occur where a well has previously been fractured and a proppant bed deposited therein and wherein the well is subsequently fractured. Such situations include old wells that are refractured to improve the production of hydrocarbons therefrom and new wells wherein pilot fractures or small fracture treatments are first carried out therein. Such small fracture treatments may be carried out to establish the pumping requirements and treatment pressures which will be needed for carrying out full-sized fracture treatments and to determine the production response expected from the formation after fracturing.

In accordance with this invention, there is provided a method for hydraulically fracturing a subterranean formation penetrated by a well to generate and prop a vertical fracture into the formation. A high fluid loss fracturing fluid that contains proppants that will settle therefrom is injected down the well and into the formation at a pressure sufficient to form and propagate a vertical fracture into the formation and form in the fracture a first proppant pack that extends outwardly from the well and upwardly from the lower portion of the fracture. A low fluid loss fluid that contains a sealant is then injected via the well into the formation and the sealant is deposited along the upper surface of the first proppant pack to reduce the permeability of this portion of the pack. Thereafter a high fluid loss fracturing fluid containing proppants that will settle therefrom is injected via the well into the formation at a pressure sufficient to extend the fracture further into the formation and form in the fracture a second proppant pack that overlies the first proppant pack and extends outwardly from the well to a distance beyond the first proppant pack. These stages may be repeated to form subsequent proppant packs and further extend the propped fracture into the formation.

Suitable fracturing fluids for use in accordance with this invention are fracturing fluids that have high fluid loss characteristics and that will allow entrained proppants or propping agents to readily settle therefrom. A preferred fracturing fluid is water that has no fluid loss additives included therein. Other additives may be included such as relatively small amounts of viscosifiers, an example of which is guar gum. Normally guar gum if included in the fracturing fluids is included in amounts no greater than about 50 lb/1000 gallons.

The low fluid loss fluid that contains a sealant is normally the same fluid used as a fracturing fluid but with fluid loss additives contained therein. Proppants may also be included therein. The low fluid loss fluid containing a sealant is injected into the fracture at a rate and in an amount sufficient to bring about the deposition of the sealant along the uppermost edge of the first proppant pack. A sufficient amount of sealant is introduced into the fracture and deposited along the upper edge of the first proppant pack to form a low permeability zone which will effectively reduce the loss of fracturing fluid into the first proppant pack and thus into the formation adjacent to the first proppant pack during the subsequent fracturing step. The rate used in injecting the low fluid loss fluid into the formation is normally equal to the rate used during the subsequent fracturing step. However, no effort is made to further extend the fracture tip or length into the formation during the injection of the low fluid loss fluid thereinto.

In accordance with an embodiment of this invention in refracturing wells which have previously been fractured and a proppant pack deposited therein, a slug of liquid containing a sealant, normally fluid loss additives, is injected via the well and into the formation to deposit the sealant or fluid loss additives along the upper surface of the previously deposited proppant pack and form a seal overlying this proppant pack. This slug of liquid desirably also contains a viscosifier. The viscosifier acts in conjunction with the fluid loss additives deposited over the upper surface of the proppant bed to form a more effective seal. In carrying out this embodiment, it is desirable to inject the slug of liquid containing fluid loss additives at a pressure less than that which would widen the fracture and possibly disturb the previously deposited proppant pack. After sealing the upper surface of the previously deposited proppant pack, the well is refractured by injecting a high fluid loss fracturing fluid containing proppants suspended therein via the well into the formation to extend the fracture further in the formation and prop the extended portion thereof.

In another embodiment of this invention, the fluid loss additives used for forming the seal over the proppant pack are selected to be of a size which will bridge the leading edge of the proppant pack. This size of fluid loss additive can be determined by laboratory measurements using packs of proppants in the size range used in the fracture treatment. In making these measurements, the proppant packs are loaded to stress loadings expected from the formation on the proppants during and after the fracture treatment. Fluids containing fluid loss additives and viscosifiers as desired may then be passed through the proppant bed to determine the optimum size of fluid loss additives and optimum concentrations of viscosifiers to yield the most effective seal along the outer edge of the proppant beds.

The proppant beds may be laid down in rhombic packing or cubic packing arrangement. Further, the fluid containing sealants may be flowed through the fracture in turbulent flow conditions or laminar flow conditions. Experiments were run using proppant beds in both rhombic packing and cubic packing arrangement formed of proppant material of sizes most commonly used in fracturing wells. The sealant was deposited on the proppant beds by flowing fluids containing the sealant in contact with the proppant beds under turbulent flow and laminar flow conditions. Data from these tests are given in TABLE 1 below.

ing fluid containing fluid loss additives is flowed in the fracture in turbulent flow regime and where a 20-40 mesh sand was used in forming a proppant pack of rhombic packing arrangement, the fluid loss additive should be selected to be of sizes within the range of 100 to 200 mesh; where the proppant pack is in cubic packing arrangement, the fluid loss additive should be selected to be of sizes within the range of 45 to 80 mesh. As a further example, where the fracturing fluid containing fluid loss additives is flowed in the fracture in laminar flow and where a proppant pack formed of 20-40 mesh proppants is present therein, the fluid loss additive should be selected to be of sizes within the range of 325 to 400 mesh for rhombic packing arrangement and 120 to 230 mesh for cubic packing arrangement.

The most common proppants used in carrying out this invention are those conventionally used in fracturing operations. Sand is the most common proppant and sand sizes varying generally from about 8 mesh to 100 mesh are often used. Sand in sizes varying from 8 to 40 mesh are most commonly used in carrying out fracturing operations.

Suitable fluid loss additives for use in accordance with this invention include graded sand and silica,

TABLE 1

| Proppant Bed | | Fluid Loss Additive Size Turbulent Flow Conditions | | | |
|---|---|---|---|---|---|
| | | Rhombic Packing | | Cubic Packing | |
| U.S. Mesh | Size, d mm | U.S. Mesh | Size, d mm | U.S. Mesh | Size, d mm |
| 8-12 | 2.38-1.68 | 40 to 60 0.42 to .250 mm | >.369 to >.260 | 18 to 25 1.00 to 0.71 mm | >.987 to >.196 |
| 10-20 | 2.00-0.84 | 50 to 100 .0297 mm to 0.147 | >.304 to >.130 | 20 to 45 0.84 to 0.351 mm | >.828 to .348 |
| 20-40 | 0.84-0.42 | 100 to 200 .147 mm to .074 | >.130 to >.065 | .45 to .80 mm | >.348 to .174 |

| Proppant Bed | | Fluid Loss Additive Size Laminar Flow Conditions | | | |
|---|---|---|---|---|---|
| | | Rhombic Packing | | Cubic Packing | |
| U.S. Mesh | Size, d mm | U.S. Mesh | Size, d mm | U.S. Mesh | Size, d mm |
| 8-12 | 2.38-1.68 | 120 to 170 0.124 to .088 mm | >.123 to >.0866 | 45 to 60 .80-.25 mm | >.329 to >.232 |
| 10-70 | 2.00-0.84 | 140 to 325 .104 to .044 mm | >.103 to >.0433 | 50 to 120 .297 to .124 mm | .276 to .116 |
| 20-40 | 0.84-0.42 | 325 to 400 .044 to .037 mm | >.0433 to .0211 | 120-230 .124-0.62 mm | .116 to .058 |

Though both rhombic and cubic packing arrangements have been found to exist in sand packs, it is considered that a sand proppant pack when first deposited in the lower portion of a fracture is usually more nearly formed in cubic packing arrangement. Thus, in accordance with an embodiment of my invention, in refracturing wells that have previously been fractured and a proppant pack deposited therein, fluid loss additives are selected for sealing the upper edge of the proppant bed by selecting a size of particles that will seal a proppant pack in cubic packing arrangement formed of propping materials of the size used in forming the first proppant pack.

In wells which have earlier been fraced and propped with sand, it has been found that the proppant pack in the fracture is usually more nearly in rhombic arrangement. Thus, in carrying out this invention for fracturing a formation which has previously been fractured and a proppant bed deposited therein, fluid loss additives are selected of a size which will bridge a rhombic bed of sand of the size used when the well was first fractured.

The proper size of fluid loss additives may readily be selected for use in accordance with this invention by reference to TABLE 1. For example, where the fracturgraded limestone, walnut shells, graded organic particles and resins, and low soluble inorganic salts.

Viscosifiers which are normally used in carrying out this invention include such viscosifiers as those described by C. E. Cooke, Jr. in SPE Preprint 5114 which was presented in Houston, Texas on Oct. 6-9, 1974, published in SPE JOURNAL OF PETROLEUM TECHNOLOGY, October 1975, pp. 1273 ff. The viscosifiers include guar gums, cellulose derivatives, and polyacrylamide.

Fluid loss control of fracturing fluids is generally obtained in two ways: (1) by addition of solid particles such as silica flour which particles form the primary bridges on which other particles build a filter cake on the surfaces of the fracture being generated, and (2) by addition of gelling agents or viscosifiers which materials increase the fracturing fluid viscosity. The increase in fluid viscosity reduces leak off and in addition the gelling agents build a low permeable filter cake with the solid particles such as silica flour.

What is claim is:

1. A hydraulic fracturing technique for generating and propping a vertical fracture in a subterranean formation penetrated by a well, comprising the steps of:
   (a) injecting via said well into said formation a high fluid loss fracturing fluid containing proppants that will settle therefrom at a pressure sufficient to form and propagate a vertical fracture into said formation and form in said fracture a first proppant pack that extends outwardly from said well and upwardly from the lower portion of said fracture;
   (b) injecting via said well into said formation a low fluid loss fluid containing a sealant to deposit said sealant along the upper surface of said first proppant pack to reduce the permeability thereof; and
   (c) injecting via said well into said formation a high fluid loss fracturing fluid containing proppants that will settle therefrom at a pressure sufficient to extend said fracture further into said formation and form in said fracture a second proppant pack overlying said first proppant pack and extending outwardly from said well to a distance beyond said first proppant pack.

2. The method of claim 1 wherein said low fluid loss fluid containing a sealant is a low fluid loss fracturing fluid containing fluid loss additives.

3. The method of claim 2 wherein said low fluid loss fracturing fluid containing fluid loss additives further contains proppants.

4. The method of claim 3 further comprising repeating at least once steps (b) and (c).

5. In a method of hydraulically fracturing a subterranean formation penetrated by a well wherein said formation has previously been treated to form a vertical fracture therein and a proppant pack deposited in the lower portion thereof, the improvement comprising:
   (a) injecting via said well into said formation a slug of liquid containing fluid loss additives to deposit said fluid loss additives along the upper surface of said proppant pack and seal said upper surface of said proppant pack; and
   (b) injecting via said well into said formation a high fluid loss fracturing fluid having proppants suspended therein at a pressure and in an amount sufficient to extend said fracture further into said formation and prop said extended portion of said fracture.

6. The method of claim 5 wherein said slug of liquid further contains a viscosifier.

7. In a method of hydraulically fracturing a subterranean formation penetrated by a well wherein said formation has previously been treated to form a vertical fracture therein and a proppant pack deposited in the lower portion thereof, the improvement comprising:
   (a) forming a liquid containing fluid loss additives of sizes selected to bridge the leading edge of said proppant bed;
   (b) injecting a slug of said liquid via said well into said formation at a pressure less that that which would widen said fracture and disturb said proppant pack and in an amount to deposit along the leading edge of said proppant pack said fluid loss additives to provide a low permeability seal along the upper leading edge of said proppant pack; and
   (c) injecting via said well into said formation a high fluid loss fracturing fluid having proppants suspended therein at a pressure and in an amount sufficient to extend said fracture further into said formation and prop said extended portion of said fracture.

8. The method of claim 7 wherein in step (a) a viscosifier is included in said liquid.

* * * * *